FIP8102 XR 3,836,735

United States Patent [11] 3,836,735
Bradley [45] Sept. 17, 1974

[54] TELEPHONE LINE CHARACTERISTIC MEASURING INSTRUMENT

[76] Inventor: Frank R. Bradley, 9 Dash Pl., Bronx, N.Y. 10463

[22] Filed: Oct. 16, 1972
[21] Appl. No.: 297,756

[52] U.S. Cl. 179/175.3 R
[51] Int. Cl. H04b 3/46
[58] Field of Search 324/77 R, 77 A, 77 B; 179/175.3; 328/139

[56] References Cited

UNITED STATES PATENTS

| | | | |
|---|---|---|---|
| 3,526,842 | 9/1970 | Andrew | 324/77 R |
| 3,546,440 | 12/1970 | Fawcett | 324/77 R |

*Primary Examiner*—Kathleen H. Claffy
*Assistant Examiner*—Douglas W. Olms
*Attorney, Agent, or Firm*—Gottlieb, Rackman, Reisman & Kirsch

[57] ABSTRACT

There is disclosed a telephone line characteristic measuring instrument which provides separate indications of the amplitude modulation, phase modulation and uncorrelated noise interference on a transmitted test tone. In my copending application Ser. No. 270,953, there is disclosed an instrument for subtracting a generated tone from the received signal; the three parameters of interest are represented in the difference signal. In the present invention, the difference signal is sampled at three different times during each half cycle of the test tone and the three sequences of samples, after filtering, peak detection and arithmetic combination, provide separate indications of the three parameters of interest.

24 Claims, 3 Drawing Figures

3836735
OR IN 179/175.3R

PATENTED SEP 17 1974 3,836,735

TELEPHONE LINE CHARACTERISTIC MEASURING INSTRUMENT

This invention relates to telephone line characteristic measuring instruments, and more particularly to instruments which provide separate indications of the levels of different types of disturbances.

In my copending application Ser. No. 270,953 filed on July 12, 1972 and entitled "TELEPHONE LINE CHARACTERISTIC MEASURING INSTRUMENT," which is hereby incorporated by reference, there is disclosed an improved technique for measuring disturbances on a test tone transmitted over a telephone line. Three of the measurements of interest are those of incidental amplitude modulation, incidental phase modulation, and uncorrelated noise. A replica of the test tone is subtracted from the received signal, and the resulting "notched noise" signal is processed in various ways to provide several different readings. While the different readings facilitate the identification of the major source of disturbance, the several readings are not directly proportional to the levels of respective types of disturbance. The amplitude modulation and phase modulation readings, for example, reflect the level of the uncorrelated noise as well as the respective parameters of interest.

It is a general object of this invention to process a notched noise signal of the type described in my copending application to derive three readings which more accurately depict the respective levels of the amplitude modulation, phase modulation and uncorrelated noise.

In accordance with the principles of this invention, the replica of the test tone (which is used to derive the notched noise signal in the first place) and its quadrature signal control the sampling of the notched noise signal at three different times during each half cycle of the test tone. The three sequences of samples are filtered, peak detected and then combined in a predetermined way to provide three separate readings, each of which is directly proportional to the level of a respective one of the three disturbances of interest.

It is a feature of my invention to derive three sample sequences from the notched noise signal, and then to process the three sequences in combinational circuits to derive three separate signals each of which represents the level of a respective one of the three types of disturbance.

Further objects, features and advantages of my invention will become apparent upon consideration of the following detailed description in conjunction with the drawing, in which.

In accordance with the principles of my invention, the test tone signal which is transmitted over the communication channel is a single frequency signal of the form Acos(wt). The received signal $V_1$, in the absence of non-linear distortion products, can be expressed as follows:

$$V_1 = AG(w)[1 + m(t)]\cos(wt + \theta(t) + n(t)$$

In this equation, $G(w)$ is the channel amplitude characteristic at the frequency of the test tone and is a measure of the loss of the channel at the test frequency, $m(t)$ is the incidental amplitude modulation, $\theta(t)$ is the incidental phase modulation and includes all of the AC components which cause the zero-crossings of a signal to "jitter" (often referred to as "phase jitter"), and $n(t)$ is the total uncorrelated interference (noise).

Figure 1:
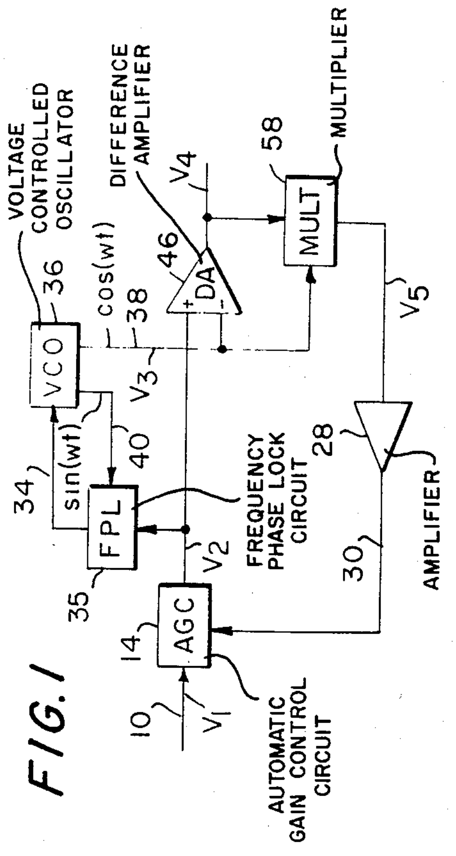
FIG. 1 depicts certain elements in the embodiment of the invention shown in my above-identified application.

The instrument disclosed in my above-identified copending application includes circuitry for "acquiring" the input signal. Such circuitry is not required for an understanding of the present invention and accordingly is not shown. FIG. 1 depicts only those elements which are necessary for an understanding of the present invention.

As shown in FIG. 1, the received signal $V_1$ on conductor 10 is applied to the input of automatic gain control circuit 14. The automatic gain control circuit functions to amplify the $V_1$ signal by a factor K so that $V_2 = KV_1$; the magnitude of the gain K is determined by the signal on conductor 30 connected to the control input of the amplifier. The amplified signal $V_2$ is applied to the input of frequency phase lock circuit 35. The other input to the frequency phase lock circuit is a signal on conductor 40 of the form $\sin(wt)$. The voltage controlled oscillator 36 generates two signals, different in phase by 90°, on conductors 38 and 40. The sine signal is compared in the frequency phase lock circuit 35 to the carrier frequency on conductor 32, and a DC signal is developed on conductor 34 whose magnitude and polarity represent the difference in the frequencies of the two input signals. Conductor 34 is extended to the control input of the voltage controlled oscillator. As the DC signal changes, so does the frequency of the oscillator. The net effect of the loop is that the voltage controlled oscillator generates two signals whose frequency is the same as the carrier frequency (test tone).

The two outputs of the voltage controlled oscillator are in phase (cosine) and in quadrature (sine) with the received test tone. The outputs are disturbance-free pure tones which track the average phase of the noisy input test tone. The time constant of the tracking loop is such that slow changes in the phase of the test tone are followed, while fast changes are not — if fast changes are followed, then phase jitter cannot be measured. The time constant of the tracking loop should be such that 20-Hz and higher phase jitter components are not attenuated since Bell System specifications require that phase jitter components in the 20–300 Hz band be identifiable.

The in-phase output of the voltage controlled oscillator is applied to one input of difference amplifier 46. The other input to the amplifier is $V_2$, the output of amplifier 14. The difference between the two signals is applied to one input of multiplier 58, and the in-phase output of the voltage controlled oscillator is applied to the other input. The output of the multiplier, $V_5$, is applied to the input of high-gain amplifier 28, whose output is extended to the control input of automatic gain control circuit 14. Amplifier 28 has an integrator at its input which serves to average out the product signal formed by multiplier 58. The integrator averages signal components whose frequencies are below 20 Hz, and has a negligible response to components whose frequencies are above 20 Hz.

The use of difference amplifier 46 in the feedback loop controls the gain of amplifier 14 such that the test tone component in the overall $V_2$ signal has an amplitude equal to the amplitude of the in-phase signal generated by oscillator 36. This means that as a result of the operation of difference amplifier 46 and the AGC loop, the $V_4$ signal at the output of the difference amplifier is equal to the normalized test signal input minus the test tone. In effect, the test tone has been subtracted from the received signal at the output of difference amplifier 46, and what remains are all of the disturbances.

It is this feedback loop which is of considerable importance because it in effect produces a pure-disturbance signal. The automatic gain control circuit is necessary in order to normalize the input signal. That is, the gain of the amplifier is automatically adjusted such that the amplitude of the test tone component at its output exactly equals the amplitude of the in-phase signal $V_3$ on conductor 38. It is due to the normalization that the output of the difference amplifier contains a negligible test tone component.

The mathematics describing the operation of the loop is as follows. Since $V_2 = KV_1$, from the expression for $V_1$ above, $$V_2 = K(AG(w)[1 + m(t)]\cos(wt + \theta(t)) + n(t))$$

Difference amplifier 46 produces a signal $V_4 = V_2 - V_3$.

$$V_4 = KAG(w)\cos(wt + \theta(t)) + KAG(w)m(t)\cos(wt + \theta(t)) + Kn(t) - \cos(wt)$$
$$= KAG(w)[\cos(wt)\cdot\cos(\theta(t)) - \sin(wt)\cdot\sin(\theta(t))] + KAG(w)m(t)[\cos(wt)\cdot\cos(\theta(t)) - \sin(wt)\cdot\sin(\theta(t))] + Kn(t) - \cos(wt).$$

Assuming a relatively small value of jitter (the usual case), $\cos(\theta(t)) \doteq 1$ and $\sin(\theta(t)) \doteq \theta(t)$.

$$V_4 = [KAG(w) - 1]\cos(wt) - KAG(w)\theta(t)\sin(wt) + KAG(w)m(t)\cos(wt) - KAG(w)m(t)\theta(t)\sin(wt) + Kn(t).$$

Since the second term in this equation is greater than the fourth by a factor of $1/m(t)$ and $m(t) << 1$, the fourth term can be ignored.

The effect of multiplier 58 is to multiply $V_4$ by $\cos(wt)$:

$$V_5 = \cos(wt)V_4$$
$$= [KAG(w) - 1]\cos^2(wt) - KAG(w)\theta(t)\cos(wt)\sin(wt) + KAG(w)m(t)\cos^2(wt) + Kn(t)\cos(wt).$$

Recalling that amplifier 28 includes an averager at its input, the fourth term in the equation for $V_5$ has no effect on the amplifier output because $n(t)$ is uncorrelated noise and its average value is zero, the average value of $\cos(wt)$ is zero, and therefore the average value of their product is zero.

With respect to the second term, the average values of both $\theta(t)$ and $\cos(wt)\sin(wt)$ are zero, so the term can be ignored insofar as its effect on the output of amplifier 28 is concerned. Finally, although the average value of $\cos^2(wt)$ in the third term is not zero, the average value of $m(t)$ is zero so the third term can be ignored.

Thus the effective input to amplifier 28 is $[KAG(w) - 1]\cos^2(wt)$. Since the amplifier has a very high gain and is included in the negative feedback path of the overall loop, the amplifier output assumes a level which adjusts the value of K such that the input to amplifier 28 is a null. Accordingly, since the average value of $\cos^2(wt)$ is not zero, $K = 1/AG(w)$.

Substituting this value of K in the equations for $V_2$ and $V_4$, we have:

$$V_2 = [1 + m(t)]\cos(wt + \theta(t)) + n(t)/AG(w)$$
$$V_4 = m(t)\cos(wt) - \theta(t)\sin(wt) + n(t)/AG(w).$$

Figure 3:
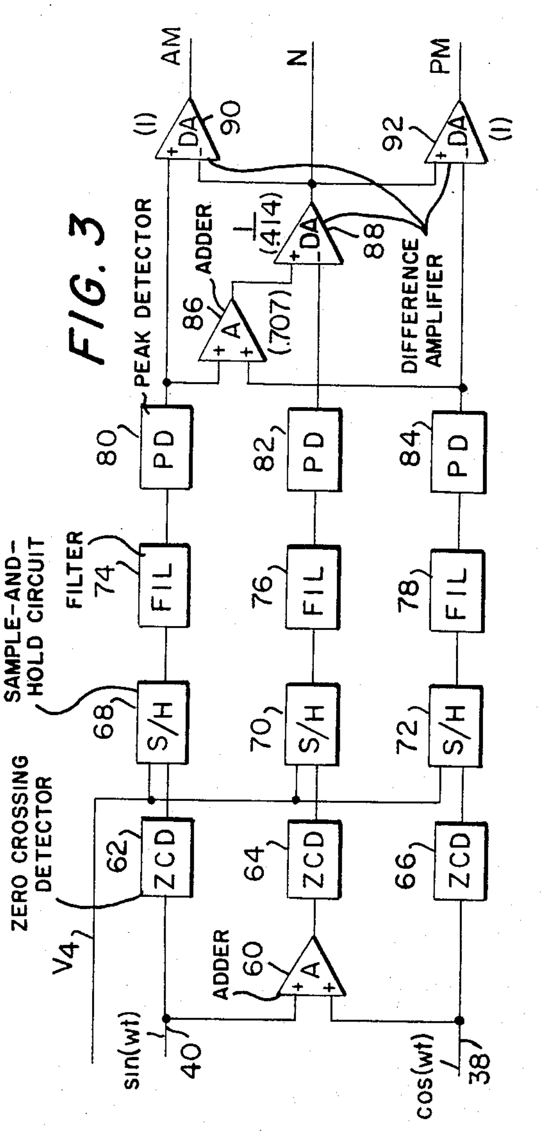
FIG. 3, taken together with FIG. 1, depicts an illustrative embodiment of the present invention.

It is this signal $V_4$ which is processed by the circuitry of FIG. 3. The signal contains three separate components originating from the amplitude modulation, the phase modulation and the uncorrelated noise. It is the function of the circuit of FIG. 3 to derive three separate measures, each corresponding to a respective one of the three types of disturbance.

Figure 2:
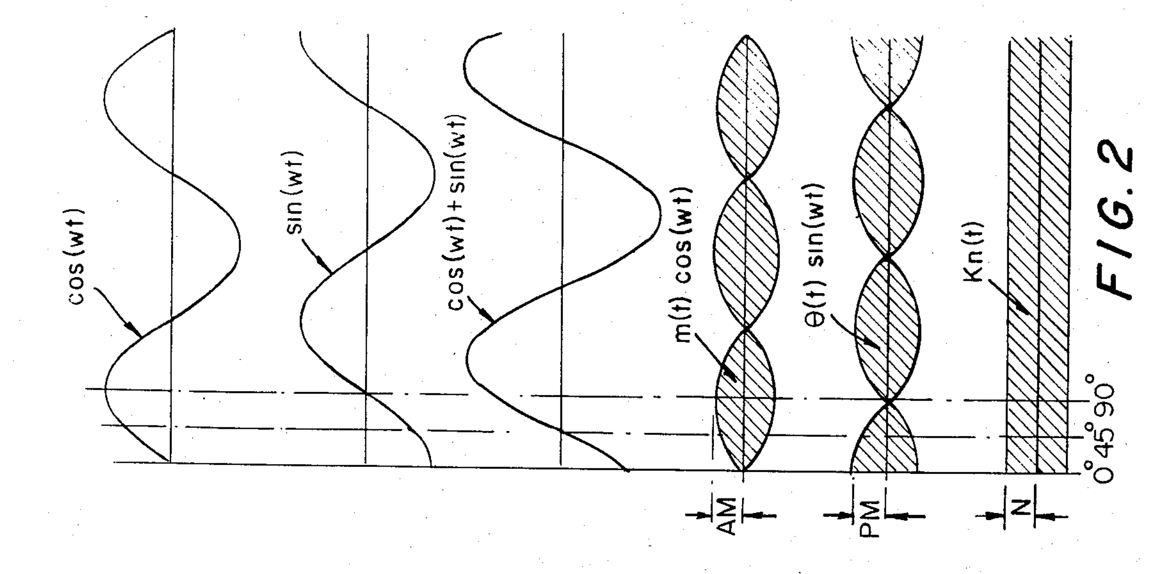
FIG. 2 depicts relationships between various waveforms which will be helpful in understanding the present invention.

FIG. 2 depicts the relationships between the three components of the $V_4$ signal. The upper waveform depicts the function $\cos(wt)$, the second waveform depicts the function $\sin(wt)$ and the third depicts the sum of the first two.

In the expression for $V_4$, the $\cos(wt)$ term is multiplied by $m(t)$. The fourth waveform in FIG. 2 depicts what would be seen on an oscilloscope with a long persistence screen which has its horizontal sweep triggered by zero crossings in the signal $\cos(wt)$. Since $m(t)$ is continuously changing and modulates the $\cos(wt)$ waveform, the instantaneous display may fall anywhere within the shaded area shown in the drawing. The amplitude of the displayed band is represented by the notation AM, and this amplitude is equal to the maximum value of $m(t)$ which occurs during the persistence time of the screen. It is this maximum value of $m(t)$ that is of interest because it represents the level of the peak to peak amplitude modulation.

Similar remarks apply to the $\theta(t)\sin(wt)$ component of $V_4$ since the $\sin(wt)$ term is multiplied by the $\theta(t)$ term in a comparable manner. The amplitude of the band displayed on the oscilloscope is represented by the notation PM, and the magnitude of PM corresponds to the maximum value of $\theta(t)$ during the persistence time of the screen. What is important to note is that the nodes of each of the two displays correspond to the peaks of the other.

The lowermost waveform in FIG. 2 simply depicts what would be seen on an oscilloscope if a signal corresponding to only the third term in the equation for $V_4$ were represented. The third term is $n(t)AG(w)$, or the noise-to-signal ratio $Kn(t)$. Since the noise is random and can be positive or negative, the positive and negative peak noise amplitudes, each multiplied by a factor of K, can be seen on the oscilloscope, together with all intermediate values corresponding to intermediate noise amplitudes. One of the objects of the invention is to measure the peak value $Kn(t)$, designated by the symbol N in the drawing. (Of course, to derive the actual noise amplitude from the measured value of noise-to-signal ratio N it is necessary to devide it by K, but this can even be done automatically since the value of K is represented by the signal on conductor 30 of FIG. 1; it is this signal which controls the gain K of amplifier 14 in the first place.)

The problem is to derive separate indications of the AM, PM and N amplitudes even though the three respective component signals appear together in $V_4$. In the illustrative embodiment of my invention, I sample the $V_4$ signal three times during each half cycle of the received test tone. The first sample is taken at the zero crossing of cos($wt$), the second sample is taken at the zero crossing of sin($wt$), and the third sample is taken at a time midway between the first two — as shown in FIG. 2, at the 0°, 45° and 90° points during each half cycle. The sample times can be determined accurately because the voltage controlled oscillator 36 in FIG. 1 generates a cos($wt$) signal which is in phase with the received test tone, as well as a quadrature signal sin ($wt$).

As shown in FIG. 3, the $V_4$ signal is applied to the input of each of sample-and-hold circuits 68, 70 and 72. Each of these sample-and-hold circuits is triggered by a respective one of the zero crossing detectors 62, 64 and 66. Zero crossing detector 66 has applied to its input the cos($wt$) signal. Whenever this signal is zero (twice every millisecond for a 1-kHz test tone), sample-and-hold circuit 72 is triggered and the instantaneous absolute magnitude (i.e., rectified)value of the $V_4$ signal appears at the output of circuit 72. Referring to FIG. 2, it will be seen that when the $m(t)$cos($wt$) component of the $V_4$ signal is zero, what appears at the output of sample-and-hold circuit 72 is a sample corresponding to PM + N. Of course, the instantaneous values of both $\theta(t)$sin ($wt$) and $n(t)$ change, so that each sample at the output of circuit 72 is not necessarily equal to PM + N. But since the frequencies in $m(t)$ and n(t) that are of the most interest are in the 20–300 Hz range, on a statistical basis, within any one-second period it is likely that the maximum value PM + N (or at least a value close to it) appears at one of the samples at the output of the sample-and-hold circuit 72.

The sin($wt$) signal is applied to the input of zero crossing detector 62, and consequently sample-and-hold circuit 68 is triggered whenever sin($wt$) equals zero. This occurs at the 90° point during each half cycle of the test tone as shown in FIG. 2. At this time, the $\theta(t)$sin($wt$) term has a value of zero, and the instantaneous magnitude of $V_4$ is attributable only to the other two components. Although the instantaneous magnitude varies, over the course of a one-second interval it is likely that at least one sample will equal the maximum value AM + N.

Both the cos($wt$) and the sin($wt$) signals generated by the circuit of FIG. 1 are applied to inputs of adder 60. The output of this adder is of the form shown in the third waveform of FIG. 2; zero crossings occur in this waveform 45° after zero crossings in the cos(wt) waveform. Thus at the 45° point in each half cycle of the test tone, sample-and-hold circuit 70 is triggered. The instantaneous magnitude of each sample taken depends upon the instantaneous magnitudes of $m(t)$, $\theta(t)$ and $n(t)$ as can be seen from an inspection of the three lowest waveforms in FIG. 2. But, on a statistical basis, it is expected that at least once every second a sample will be taken when each of the three disturbance components is at a peak value. However, the contributions of the $m(t)$ and $\theta(t)$ components are not equal to AM and PM because, at the 45° point in each cycle of the test tone, cos($wt$) = sin($wt$) = .707. Consequently, at least once every second the sample at the output of sample-and-hold circuit 70 will be nearly equal to the maximum value .707(AM + PM) + N.

The modulation and noise signals of interest are in the 20–300 Hz band. These are represented by the output of each sample-and-hold circuit which consists of 2,000 steps (for a 1-kHz test tone) each second. In order to eliminate the 1-kHz and higher harmonics introduced by the sampling, the output of each of the sample-and-hold circuits is extended through a respective one of the 20–300 Hz filters 74, 76 and 78. The output of each filter is extended to the input of a respective one of the peak detectors 80, 82 and 84. Each peak detector provides a signal at its output which equals the peak signal at its input during a preceding short interval. Typically, for a pulse input to each peak detector, the output decays to 80% of the peak value in one second. Thus each peak detector provides a signal at its output which is approximately equal to the peak signal at its input during the preceding second. Since on a statistical basis the peak input to each of the peak detectors during each one-second interval is a respective one of the quantities AM + N, .707(AM + PM) + N, and PM + N, it is apparent that these peak values appear continuously at the outputs of the peak detectors. It is from these three values that the quantities of interest — AM, PM and N — are derived by utilizing adder 86 and the three difference amplifiers 88, 90 and 92. (In the event it is known that $n(t)$ is negligible, elements 60, 64, 70, 76, 82, 86 and 88 can be omitted and the outputs of peak detectors 80 and 84 provide direct measures of AM and PM.)

Adder 86 has a scale factor of .707, and consequently its output is equal to .707(AM + N) + .707(PM + N). This output is extended to the plus input of difference amplifier 88, while the input to the minus input is the output of peak detector 82, namely, .707(AM + PM) + N. When this second term is subtracted from the first, and the difference is multiplied by the scale factor (1/.414) of difference amplifier 88, the resulting signal is simply N. Thus the output of difference amplifier 88 provides an indication of one of the three quantities of interest.

The output of difference amplifier 88 is extended to the minus input of difference amplifier 90, while the output of peak detector 80 —AM + N — is extended to the plus input. The scale factor of the difference amplifier is unity, and consequently the output of difference amplifier 90 is simply AM. Similarly, in difference amplifier 92, whose scale factor is also unity, the quantity N is subtracted from the quantity PM + N, and the output is simply PM.

Thus three separate measurements may be made using the system of FIGS. 1 and 3, with each measurement corresponding to the level of a different type of disturbance. In the derivation of the equation for $V_4$, it was assumed that $\cos(\theta(t)) \doteq 1$ and $\sin(\theta(t) \doteq \theta(t)$. This assumption is generally valid since it presupposes a normally low level of amplitude modulation and phase modulation, a condition which is usually satisfied. But to a small degree there are second-order "cross-talk" terms which do contribute to errors, although not materially.

Thus it is seen that even though the notched noise signal $V_4$ is a mixture of three different types of disturbance, it is possible to isolate the amplitude of each type. This greatly simplifies the testing and adjustment of telephone lines because it allows the rapid identification of the most prevalent type of disturbance. In more general terms, the invention provides for the identification of the peak magnitudes of $a(t)$, $b(t)$, and $c(t)$ in a signal of the form $a(t)\cos(wt) + b(t)\sin(wt) +$ $c(t)$, even if $a(t)$, $b(t)$ and $c(t)$ are random functions of time.

Although the invention has been described with reference to a particular embodiment, it is to be understood that this embodiment is merely illustrative of the application of the principles of the invention. For example, instead of triggering each sample-and-hold circuit twice during each cycle, the circuit may be triggered more or less often, or at different points during each cycle, provided that each sample is taken at the proper time relative to the test tone. Similarly, average value detectors rather than peak detectors can be used. Also, the method of the invention can be used by appropriately programming a digital computer. Thus it is to be understood that numerous modifications may be made in the illustrative embodiments of the invention and other arrangements may be devised without departing from the spirit and scope of the invention.

What I claim is:

1. A system for determining functions of $a(t)$, $b(t)$ and $c(t)$ from an input signal of the form $a(t)\cos(wt) + b(t)\sin(wt) + c(t)$, where $a(t)$, $b(t)$ and $C(t)$ are functions of time, comprising means for sampling periodically said signal at at least three points during cycles of cos(wt), means connected to said sampling means for operating on respective sequences of samples taken at the three respective points in said cycles to derive respective outputs, and means connected to said operating means for selectively combining the outputs thereof to derive said functions of $a(t)$, $b(t)$ and $c(t)$.

2. A system in accordance with claim 1 wherein said three points in said cycles are separated by multiples of 45° and said operating means derives three outputs as follows:

1. $A(t) + C(t)$
2. $B(t) + C(t)$
3. $.707[A(t) + B(t)] + C(t)$ where $A(t)$, $B(t)$ and $C(t)$ are respective functions of $a(t)$, $b(t)$ and $c(t)$, and wherein said combining means includes means for adding the first and second outputs, means for subtracting the third output from the added outputs multiplied by .707 and multiplying the difference by 1/.414 to derive $C(t)$, means for subtracting $C(t)$ from the first output to derive $A(t)$, and means for subtracting $C(t)$ from the second output to derive $B(t)$.

3. A system in accordance with claim 2 wherein said sampling means includes means for detecting zero crossings in three control signals $\cos(wt)$, $\sin(wt)$ and $\cos(wt) + \sin(wt)$, and a respective sampling circuit responsive to zero crossings in each of said three control signals for sampling said input signal.

4. A system in accordance with claim 3 wherein said operating means includes a respective filtering and peak-detecting means for operating on the samples of each of said sampling circuits to derive a respective one of said three outputs.

5. A system in accordance with claim 4 wherein said input signal is a notched-noise transmitted test tone, $a(t)$ is the incidental amplitude modulation, $b(t)$ is the incidental phase modulation, and $c(t)$ is uncorrelated noise.

6. A system in accordance with claim 1 wherein said sampling means includes means for detecting zero crossings in three control signals $\cos(wt)$, $\sin(wt)$ and $\cos(wt) + \sin(wt)$, and a respective sampling circuit responsive to zero crossings in each of said three control signals for sampling said input signal.

7. A system in accordance with claim 6 wherein said operating means includes a respective filtering and peak-detecting means for operating on the samples of each of said sampling circuits to derive a respective one of three outputs.

8. A system in accordance with claim 6 wherein said input signal is a notched-noise transmitted test tone, $a(t)$ is the incidental amplitude modulation, $b(t)$ is the incidental phase madulation, and $c(t)$ is uncorrelated noise.

9. A system in accordance with claim 1 wherein said input signal is a notched-noise transmitted test tone, a(t) is the incidental amplitude modulation, $b(t)$ is the incidental phase modulation, and $c(t)$ is uncorrelated noise.

10. A method for determining functions of $a(t)$, $b(t)$ and $c(t)$ from an input signal of the form $a(t)\cos(wt) + b(t)\sin(wt) + c(t)$, where $a(t)$, $b(t)$ and $c(t)$ are functions of time, comprising the steps of sampling periodically said signal at at least three points during cycles of $\cos(wt)$, operating on respective sequences of samples taken at the three respective points in said cycles to generate three outputs, and selectively combining the generated outputs for deriving said functions of $a(t)$, $b(t)$ and $c(t)$.

11. A method in accordance with claim 10 wherein said three points in said cycles are separated by multiples of 45° and said three outputs are as follows:

1. $A(t) + C(t)$
2. $B(t) + C(t)$
3. $.707[A(t) + B(t)] + C(t)$ where $A(t)$, $B(t)$ and $C(t)$ are respective functions of $a(t)$, $b(t)$ and $c(t)$, and wherein said combining step includes the sub-steps of adding the first and second outputs, subtracting the third output from the added outputs multiplied by .707 and multiplying the difference by 1/.414 to derive $C(t)$, subtracting $C(t)$ from the first output to derive $A(t)$, and subtracting $C(t)$ from the second output to derive $B(t)$.

12. A method in accordance with claim 10 wherein said sampling step includes the sub-steps of detecting zero crossings in three control signals $\cos(wt)$, $\sin(wt)$ and $\cos(wt) + \sin(wt)$, and controlling a respective sampling sequence responsive to the detection of zero crossings in each of said three control signals.

13. A method in accordance with claim 10 wherein said operating step includes the sub-steps of filtering and peak-detecting the samples in each of the three sample sequences to generate a respective one of said three outputs.

14. A method in accordance with claim 10 wherein said input signal is a notched-noise transmitted test tone, $a(t)$ is the incidental amplitude modulation, $b(t)$ is the incidental phase modulation, and $c(t)$ is uncorrelated noise.

15. A method for determining functions of $a(t)$ and $b(t)$ from an input signal of the form $a(t)\cos(wt) + b(t)\sin(wt)$, where $a(t)$ and $b(t)$ are functions of time, comprising the steps of sampling periodically said signal at times corresponding to minimum and maximum values of the absolute magnitude of $\cos(wt)$, and processing respective sequences of samples taken at respective times in said cycles to derive said functions of $a(t)$ and $b(t)$ from the respective sequences of samples.

16. A method in accordance with claim 15 wherein said sampling step includes the sub-steps of detecting zero crossings in two control signals cos($wt$) and sin($wt$) and controlling a respective sampling sequence responsive to the detection of zero crossings in each of said two control signals.

17. A method in accordance with claim 16 wherein said processing step includes the sub-step of filtering and peak-detecting the samples in each of the two sample sequences to generate a respective one of said functions of $a(t)$ and $b(t)$.

18. A method in accordance with claim 17 wherein said input signal is a notched-noise transmitted test tone, $a(t)$ is the incidental amplitude modulation and $b(t)$ is the incidental phase modulation.

19. A method in accordance with claim 15 wherein said processing step includes the sub-steps of filtering and peak-detecting the samples in each of the two sample sequences to generate a respective one of said functions of $a(t)$ and $b(t)$.

20. A method in accordance with claim 15 wherein said input signal is a notched-noise transmitted test tone, $a(t)$ is the incidental amplitude modulation and $b(t)$ is the incidental phase modulation.

21. A method for determining functions of $a(t)$ and $n(t)$ from an input signal of the form $a(t)\cos(\mathrm{wt})+n(t)$ where $a(t)$ and $n(t)$ are functions of time, comprising the steps of sampling periodically said signal at times corresponding to minimum and maximum values of the absolute magnitude of cos($wt$), and processing respective sequences of samples taken at respective times in said cycles to derive said functions of $a(t)$ and $n(t)$ from the respective sequences of samples.

22. A method in accordance with claim 21 wherein said sampling step includes the sub-steps of detecting zero crossings in a control signal cos($wt$), and controlling a respective sampling sequence responsive to the detection of zero crossings at times corresponding to minimum and maximum values of the absolute magnitude of cos($wt$).

23. A method in accordance with claim 21 wherein said processing step includes the sub-steps of filtering and peak-detecting the samples in each of the two sample sequences to generate a respective one of said functions of $a(t)$ and $n(t)$.

24. A method in accordance with 23 wherein said input signal is a notched-noise transmitted test tone, $a(t)$ is incidental modulation and $n(t)$ is uncorrelated noise.

* * * * *